Patented July 18, 1944

2,354,177

UNITED STATES PATENT OFFICE 2,354,177

METHOD OF PREPARING FLUOSILICIC ACID AND FLUOSILICIC ACID SALTS

Henry C. Kawecki, Temple, Pa., assignor, by mesne assignments, to Reconstruction Finance Corporation, New York, N. Y., a corporation of the United States No Drawing. Application December 20, 1941, Serial No. 423,770

5 Claims. (Cl. 23—88)

This invention relates to chemical processes and has for its object the provision of a process for producing fluosilicic acid and fluosilicic acid salts.

Another object is to provide an economically practical cyclic process for producing sodium fluosilicate.

Other objects and advantages will be apparent as the invention is more fully hereinafter disclosed.

In accordance with these objects I have discovered that fluorspar (calcium fluoride) and silica ($SiO_2$) in suspension in an aqueous solution of sulphuric acid ($H_2SO_4$) containing from 5 to 40% $H_2SO_4$ (by weight) will react in accordance with the following equation:

$$3H_2SO_4 + 3CaF_2 + SiO_2 + 4H_2O = H_2SiF_6 + 3CaSO_4 \cdot 2H_2O$$

The reaction proceeds slowly at room temperatures but at an accelerated rate at higher temperatures and at a temperature within the range 60–70° C. proceeds at an economically practical rate particularly when the acid concentration approximates 30% (by weight).

The two materials, fluorspar and silica, preferably are ground to pass 100 mesh. Larger particle size material may be employed, if desired, however, the time of reaction increases directly with the increase in particle size at any given acid concentration and solution temperature. I prefer to employ the silica material known in the art as diatomaceous earth in the practice of the present invention for the reason that it is a form of silica available in large quantities at a very low cost and is in a physical state particularly adapted for use in the present invention.

The fluosilicic acid solution obtained by the above reaction after the removal of the calcium sulfate precipitate therefrom, is a valuable product commercially. It is preferable, however, to convert the acid into a fluosilicate compound, such as for example, sodium, potassium or magnesium fluosilicate, by adding to the acid solution the required chemically equivalent amounts of the oxide, hydroxide, carbonate, sulfate or chloride compounds of the metal constituent of the fluosilicate compound to be formed.

As a specific example of this reaction, the addition of sodium carbonate to the fluosilicic acid solution forms sodium fluosilicate according to the following reaction:

$$Na_2CO_3 + H_2SiF_6 \rightarrow Na_2SiF_6 + H_2O + CO_2$$

Alternatively, the addition of sodium sulfate to the fluosilicic acid solution forms sodium fluosilicate and sulfuric acid according to the following reaction:

$$Na_2SO_4 + H_2SiF_6 \rightarrow Na_2SiF_6 + H_2SO_4$$

The reaction involving a sulfate compound and fluosilicic acid provides an economically practical method of producing fluosilicate compounds in a cyclic process. By properly apportioning the reacting compounds, the resultant $H_2SO_4$ acid solution, after filtering off the insoluble fluosilicate may be returned to the first step of the process and re-used in the digestion of fluorspar and silica, thereby cutting down the sulfuric acid addition to maintain the reaction by approximately one-third.

As an example of this modification, 275 grams of fluorspar, analyzing 85% $CaF_2$ and about 67 grams of diatomaceous earth, analyzing about 90% $SiO_2$ when digested for about one hour in about 800 c. c. of a 35% $H_2SO_4$ solution (by weight) at a temperature of about 70° C. produced a fluosilicic acid solution, which after being separated from the precipitated calcium sulfate by filtration and subsequent washing with water using just enough wash water to maintain a filtrate volume of about 800 c. c., yielded, on the addition thereto of about 140 grams of sodium sulfate ($Na_2SO_4$) and cooling to room temperature, about 158 grams of sodium fluosilicate and a volume of sulfuric acid solution having a sulfuric acid content of from 10 to 12% and a residual sodium fluosilicate content of less than 1%. By adding sulfuric acid to the above solution in an amount necessary to bring the acid content to 35% the solution may be re-utilized in the digestion of a second batch of fluorspar and diatomaceous earth as in the first step with the advantage that residual sodium fluosilicate content of the final solution remains a constant factor insuring a recovery of sodium fluosilicate approximating 85 to 90% of the theoretical.

In place of sodium sulfate in the above specific embodiment any other alkali metal sulfate may be employed. Alternatively where the factor of saving sulfuric acid is not involved any halide compound of the alkali metals may be substituted for the sulfate compound without essential departure from the present invention. Sodium chloride, for example, in place of sodium sulfate yields the sodium fluosilicate and an aqueous solution of hydrochloric acid.

From the above description of the present invention and of the specific embodiments given, it is believed apparent that many modifications and adaptations of the same may be made without essential departure therefrom and all such are contemplated as may fall within the scope of the following claims.

What I claim is:

1. The method of forming a fluosilicic acid solution which comprises suspending calcium fluoride and silica, each in finely divided condition, in an aqueous sulfuric acid solution containing from 5 to 40%, by weight, sulfuric acid, the calcium fluoride and silica being present in said suspension in the relative proportions of 3 molar weights of the fluoride to each molar weight of the silica and the volume of said solution being sufficient to provide a sulfuric acid content of at least 3 molar weights $H_2SO_4$ to each 3 molar weights of fluoride present, heating the suspension for an extended time interval to a temperature within the range 60–70° C., and separating the solution from the insolubles remaining.

2. The method of forming a fluosilicic acid solution which comprises suspending about 275 grams of fluorspar and about 67 grams of diatomaceous earth, each having a particle size of under 100 mesh, in about 800 c. c. of a 35% $H_2SO_4$ (by weight) solution and heating the solution for an extended time interval to a temperature approximating 70° C. and separating the solution from the insolubles remaining.

3. The method of forming sodium silico fluoride which comprises suspending calcium fluoride and silica, each in finely divided condition, in the relative proportions of 3 molar weights of the fluoride to one molar weight of the silica, in a sulfuric acid aqueous solution containing from 5 to 40%, by weight, sulfuric acid, the volume of said solution being at least sufficient to provide 3 molar weights of sulfuric acid for each 3 molar weights of calcium fluoride suspended therein, heating the solution to a temperature within the range 65–70° C. for an extended time interval, separating the solution obtained from the insoluble material remaining and adding to the solution an amount of sodium sulfate that is approximately sufficient to precipitate from the solution substantially all of the fluosilicic acid present therein, cooling the solution to about atmospheric temperatures and separating the precipitated sodium silico fluoride from the solution.

4. The method of forming sodium silico fluoride which comprises suspending fluorspar and diatomaceous earth, each having a particle size passing about 100 mesh, in the relative proportions of about 275 grams of fluorspar to each 67 grams of diatomaceous earth in a volume of a 35% $H_2SO_4$ (by weight) aqueous solution providing at least 3 molar weights of $H_2SO_4$ for each molar weight of silica present therein, heating the suspension at a temperature of about 70° C. for an extended time interval, separating the solution obtained from the insolubles present therein, adding to the said solution an amount of sodium sulfate approximately sufficient to react substantially completely with the fluosilicic acid content of the said solution, cooling the solution to room temperatures and separating the precipitated sodium fluosilicate from the solution.

5. The method of claim 4 wherein sulfuric acid in an amount sufficient to bring the acid content thereof up to its original value of 35% $H_2SO_4$ is added to the solution finally obtained and said solution is then employed in substitution for the $H_2SO_4$ solution first mentioned in the treatment of another batch of fluorspar and diatomaceous earth.

HENRY C. KAWECKI.